United States Patent Office 3,248,244
Patented Apr. 26, 1966

3,248,244
ADHESIVE COMPOSITIONS CONTAINING A NITRO-SUBSTITUTED ALKYLESTER STABILIZER
Edward B. Hodge and Grant J. Lafferty, Terre Haute, Ind., assignors to Commercial Solvents Corporation, New York, N.Y., a corporation of Maryland
No Drawing. Filed May 17, 1962, Ser. No. 195,376
12 Claims. (Cl. 106—125)

Our invention relates to adhesive compositions. More particularly our invention relates to adhesive compositions stabilized against attack by microorganisms.

Adhesive compositions are made from a wide variety of materials and have many and varied applications. Generally most adhesives are separated into three main categories: those which are of an animal origin such as the animal glues, the fish glues, and the casein pastes; those of vegetable origin such as the gums, the starch adhesives, the dextrin adhesives, the rubber latex adhesives, and the natural resin adhesives; and the synthetic adhesives such as the synthetic resins, for example, those of the urea-formaldehyde, phenol-formaldehyde, acrylic, and vinyl types. All such adhesives possess one common property, the ability to enable surfaces to merge on contact or under pressure and after merger, resist separation.

A common problem of adhesive compositions is their lack of resistance to attack by certain microorganisms during storage. On certain of the widely used types of adhesives, particularly casein adhesives and starch adhesives, spoilage takes place in a matter of days. Such spoilage, which can finally cause coagulation and even separation of the adhesive, is easily observed by the formation of mold and the production of highly noxious odors.

We have now discovered a means whereby adhesive compositions can be made resistant to spoilage. Our new adhesive compositions even retain this resistance after long storage periods. Thus, our stabilized adhesive compositions are not only effective in preventing mold formation and noxious odors but successfully inhibit decomposition, coagulation and separation of the adhesive composition itself.

Our adhesive compositions are produced by incorporating a stabilizing amount of a nitro-substituted alkylester formed from the condensation of a lower nitroalkanol and a mono basic alkyl carboxylic acid into the adhesive composition. The nitro-substituted alkylesters utilized in our invention can be produced by the condensation of a lower nitroalkanol and a mono basic alkyl carboxylic acid in the presence of an acid catalyst. In preparing the nitro-substituted alkylesters, we prefer to first form a benzene solution of the acid and the nitroalkanol using approximately a 10% excess of the theoretically reactant amount of the nitroalkanol, reflux the said solution in the presence of an acid catalyst such as sulfuric acid or paratoluene sulfonic acid until the final product is formed in the reaction mixture. The product is then recovered from the reaction mixture by subsequently cooling, washing, and concentrating the mixture to obtain the desired product.

Examples of suitable nitro-substituted alkylesters coming within the scope of our invention are 2-nitrobutyl acetate, 2-nitrobutyl propionate, 2-nitrobutyl butyrate, 2-nitropropyl acetate, 4-nitro-3-hexanol acetate, etc., and the like.

The amount of nitro-substituted alkylester necessary to stabilize adhesive compositions will naturally vary depending in the main on the particular adhesive to be stabilized and the conditions of storage. Usually, however, amounts as low as 100 p.p.m. by weight based on the weight of the adhesive compositions are effective in controlling spoilage. Generally we have found that it is not necessary to exceed 1,000 p.p.m. of our stabilizing agents in the adhesive compositions. Under most circumstances satisfactory results are obtained when 250 p.p.m. to 500 p.p.m. of our stabilizers are utilized.

The following examples further illustrate our invention, but we do not intend to be limited to the procedures, types of adhesives, or amounts of nitro-substituted alkylesters set out therein. Inclusion of all equivalents obvious to the art is intended.

EXAMPLE I

To test the effectiveness of our nitro-substituted alkylesters in preserving adhesive compositions, a casein adhesive composition containing 70 grams casein, 7 mls. of a 29% ammonia solution, and 623 mls. of water was divided into 6 equal portions. A nitro-substituted alkylester stabilizing agent was added to 5 of the 6 portions and the remaining portion was used as a control. Each of the 6 portions was then inoculated with a mold found growing in a casein-adhesive composition. Each of the 6 portions was then placed in a separate open jar and allowed to stand for 30 days. The following table shows the results of the 30-day test.

Table I

| Portion | Nitro-substituted alkylester | Amount of nitro-substituted alkylester, p.p.m. | Mold Formation |
|---|---|---|---|
| 1 | 2-nitrobutyl acetate | 250 | None. |
| 2 | 2-nitrobutyl propionate | 500 | None. |
| 3 | 2-nitrobutyl butyrate | 1,000 | None. |
| 4 | 2-nitropropyl acetate | 1,000 | None. |
| 5 | 4-nitro-3-hexanol acetate | 1,000 | None. |
| 6 | Control | | Covered Sample. |

EXAMPLE II

The procedure of Example I was followed with the exception that a polyvinyl alcohol starch adhesive containing 35 grams polyvinyl alcohol, 70 grams corn starch, and 525 mls. water was utilized instead of the casein adhesive of Example I. The following table shows the results of this test.

Table II

| Portion | Nitro-substituted alkylester | Amount of nitro-substituted alkylester, p.p.m. | Mold Formation |
|---|---|---|---|
| 1 | 2-nitrobutyl acetate | 500 | None. |
| 2 | 2-nitrobutyl propionate | 1,000 | None. |
| 3 | 2-nitrobutyl butyrate | 500 | None. |
| 4 | 2-nitropropyl acetate | 500 | None. |
| 5 | 4-nitro-3-hexanol acetate | 1,000 | None. |
| 6 | Control | | Covered Sample. |

EXAMPLE III

An adhesive composed of 24 kilograms dextrin, 24 liters of water, and 10 grams of ginger grass oil was effectively stabilized by 2-nitrobutyl acetate.

EXAMPLE IV

A vegetable glue adhesive composition composed of 100 grams of gum arabic, 0.2 gram calcium hydroxide, 300 ml. of water, and 10 grams of aluminum sulfate was effectively stabilized by 2-nitrobutyl propionate.

EXAMPLE V

An adhesive composition composed of 100 grams of glue, 100 mls. of water, 5 grams of glycerin, and 3 grams of potassium bichromate was effectively stabilized by 2-nitropropyl acetate.

EXAMPLE VI

An adhesive composition composed of 17 pounds castor oil, 100 pounds pine resin, and 50 pounds denatured alcohol was effectively stabilized by 4-nitro-3-hexanol acetate.

Now having described our invention, what we claim is:

1. An adhesive composition stabilized against microorganism attack which comprises an adhesive selected from the group consisting of casein adhesive, starch adhesive, glue adhesive and rubber latex adhesive and a stabilizing amount of a nitrosubstituted alkylester formed from the condensation of a lower nitroalkanol and a mono basic alkyl carboxylic acid.

2. The composition of claim 1 wherein the adhesive is a casein adhesive.

3. The composition of claim 1 wherein the adhesive is a starch adhesive.

4. The composition of claim 1 wherein the adhesive is a glue adhesive.

5. The composition of claim 1 wherein the adhesive is a rubber latex adhesive.

6. An adhesive composition stabilized against microorganism attack which comprises an adhesive selected from the group consisting of casein adhesive, starch adhesive, glue adhesive and rubber latex adhesive and from about 100 to about 1,000 p.p.m. of a nitro-substituted alkylester formed from the condensation of a lower nitroalkanol and a mono basic alkyl carboxylic acid.

7. An adhesive composition stabilized against microorganism attack which comprises an adhesive selected from the group consisting of casein adhesive, starch adhesive, glue adhesive and rubber latex adhesive and from about 250 to about 500 p.p.m. of a nitro-substituted alkylester formed from the condensation of a lower nitroalkanol and a mono basic alkyl carboxylic acid.

8. The composition of claim 7 wherein the nitro-substituted alkylester is 2-nitrobutyl acetate.

9. The composition of claim 7 wherein the nitro-substituted alkylester is 2-nitrobutyl propionate.

10. The composition of claim 7 wherein the nitro-substituted alkylester is 2-nitrobutyl butyrate.

11. The composition of claim 7 wherein the nitro-substituted alkylester is 2-nitropropyl acetate.

12. The composition of claim 7 wherein the nitro-substituted alkylester is 4-nitro-3-hexanol acetate.

References Cited by the Examiner
UNITED STATES PATENTS

| | | | |
|---|---|---|---|
| 2,116,867 | 5/1938 | Kreimeier et al. | 106—210 |
| 2,888,422 | 5/1959 | Johnson et al. | 260—29.7 |
| 2,976,236 | 3/1961 | Bennett et al. | 167—22 |
| 3,058,835 | 10/1962 | Sheeran | 106—146 |

ROBERT F. WHITE, *Primary Examiner.*

MORRIS LIEBMAN, ALEXANDER H. BRODMERKEL, *Examiners.*